United States Patent [19]

Itami et al.

[11] Patent Number: 4,767,483

[45] Date of Patent: Aug. 30, 1988

[54] METHOD OF MANUFACTURING A MAGNETIC RECORDING MEDIUM

[75] Inventors: Teruhiko Itami; Toshifumi Kimoto; Akira Yamasawa; Koichi Saitoh, all of Kanagawa, Japan

[73] Assignee: Fuji Xerox Co., Ltd., Kanagawa, Japan

[21] Appl. No.: 929,355

[22] Filed: Nov. 12, 1986

Related U.S. Application Data

[63] Continuation of Ser. No. 555,887, Nov. 28, 1983, abandoned.

[30] Foreign Application Priority Data

Nov. 29, 1982 [JP] Japan .................................. 57-207571

[51] Int. Cl.$^4$ ............................................. B32B 31/00
[52] U.S. Cl. ..................................... 156/154; 29/604; 156/182; 156/272.4; 156/273.3; 156/310; 156/315; 360/131; 428/900
[58] Field of Search ................ 156/154, 310, 182, 315, 156/272.4, 273.3; 428/900; 360/131; 29/604

[56] References Cited

U.S. PATENT DOCUMENTS

| | | | |
|---|---|---|---|
| 2,643,130 | 6/1953 | Kornei | 360/131 |
| 3,001,891 | 9/1961 | Stoller | 360/131 |
| 4,157,932 | 6/1979 | Hirata | 156/310 |
| 4,244,998 | 1/1981 | Smith | 428/900 |
| 4,275,113 | 6/1981 | Saito et al. | 428/900 |

FOREIGN PATENT DOCUMENTS

| | | | |
|---|---|---|---|
| 54-29086 | 9/1979 | Japan | 428/900 |
| 57-30118 | 2/1982 | Japan | 360/131 |

*Primary Examiner*—John J. Gallagher
*Attorney, Agent, or Firm*—Finnegan, Henderson, Farabow, Garrett and Dunner

[57] ABSTRACT

A method for manufacturing a magnetic recording medium comprising a first step in which a first magnetic layer, having a repetitive magnetization pattern formed by a magnetic head over its entire surfaces is formed on a base layer. The base layer and the first magnetic layer together form a first laminated body. In a second step, a second magnetic layer in which magnetic particles are oriented in a predetermined direction and which is thermally magnetizable is formed on a second base layer. The second base layer and the second magnetic layer form a second laminated body. In a third step, the second laminated body is bonded to the first laminated body.

10 Claims, 5 Drawing Sheets

METHOD OF MANUFACTURING A MAGNETIC RECORDING MEDIUM

This application is a continuation of application Ser. No. 555,887, filed Nov. 28, 1983, now abandoned.

FIELD OF THE INVENTION

This invention relates to a method of manufacturing a magnetic recording medium for a magnetic copying apparatus, and, more particularly, to a method of manufacturing a magnetic recording medium in which a first magnetic layer having a uniform magnetization pattern and a second magnetic layer which is thermally magnetizable are laminated to a base layer.

BACKGROUND OF THE INVENTION

In a magnetic recording method utilizing residual magnetic effect, a permanent image (or a hard copy) is obtained through the following four steps:
(1) A magnetic latent image is formed on a magnetic member;
(2) The latent image is developed with a magnetic toner or coloring particles affected by a magnetic field, the magnetic toner or coloring particles being prepared by mixing magnetic particles in a high molecular resin;
(3) The developed image is transferred onto a recording sheet or the like according to an electrostatic method or a magnetic method; and
(4) The transferred image is fixed with heat or pressure into a permanent image (hard copy).

In the above-described magnetic recording method, after removal of the magnetic toner, the magnetic recording medium bearing the magnetic latent image is supplied to the next developing operation, or the magnetic latent image is erased to form a new magnetic latent image, so that the same process may be carried out again.

With respect to this magnetic recording method, there have been proposed a variety of methods of forming magnetic latent images. Among these conventional methods is a so-called "thermomagnetic recording method" in which thermal inputs are utilized to form magnetic latent images. In this method, an inexpensive heating array can be used as the latent image forming means.

With respect to a latent image forming method in the above-described thermomagnetic recording method and a thermomagnetic recording medium used therein, Japanese Patent Application No. 37865/1981 describes an invention which makes an external bias magnetic field unnecessary, and produces an image of excellent quality by developing a latent image with powder.

OBJECTS AND SUMMARY OF THE INVENTION

In view of the above-summarized background, it is an object of the present invention to produce a magnetic recording medium through a simple and economical process.

A further object of the present invention is a method of manufacturing a magnetic recording medium which enhances the quality of images developed by the thermo-magnetic recording method.

Still another object of the present invention is a method of manufacturing a magnetic recording medium having a first magnetic layer with a greater coercive force and residual magnetism than a second magnetic layer.

These and other objects are accomplished by a method of manufacturing a magnetic recording medium comprising the steps of forming a first magnetic layer on one surface of a first base member, forming a repetitive magnetization pattern in said first magnetic layer, forming a second laminated body by coating a second magnetic layer on one surface of a second base member, applying a magnetic field to said second magnetic layer to orient the magnetic particles in said second magnetic layer in a predetermined direction, and bonding the first laminated body to the second laminated body.

BRIEF DESCRIPTION OF THE DRAWINGS

These and other objects, features, and advantages of the invention, as well as the invention itself, will become more apparent to those skilled in the art when considered in the light of the accompanying drawings wherein.

DETAILED DESCRIPTION OF THE PREFERRED EMBODIMENT

Before the preferred embodiment of the invention is described in detail, the thermomagnetic recording method will be described. In this regard FIG. 1 is an explanatory diagram of the structure of a recording medium employed in thermomagnetic recording.

Figure 1A:
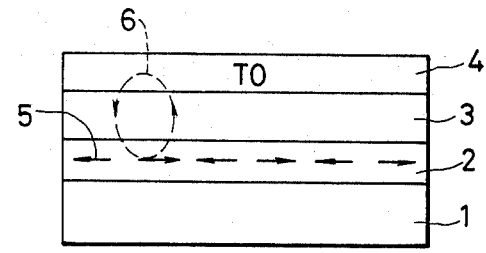
FIGS. 1(a)–1(c) schematically illustrate the thermomagnetic recording method.
Figure 1B:
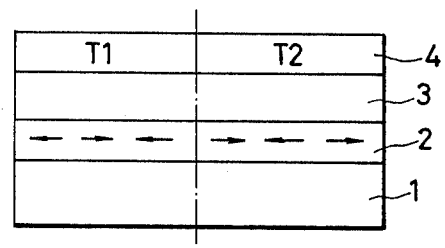
Figure 1C:
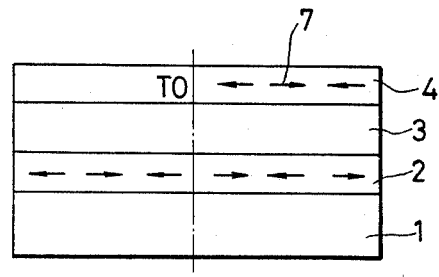

The recording medium, as shown in part (a) of FIG. 1, comprises a non-magnetic base layer 1, a first magnetic layer 2 having a magnetic pattern, a non-magnetic intermediate layer 3, and a second magnetic layer 4. The non-magnetic intermediate layer 3 may be eliminated and replaced by a protective layer (not shown) formed on the surface of the second magnetic layer 4.

Part (a) of FIG. 1 shows a magnetic state of the magnetic recording medium which is provided before a magnetic latent image is formed by inputting a thermal pattern. As is apparent from part (a) of FIG. 1, a repetitive pattern as indicated at 5 is formed over the entire surface.

It can be considered that a magnetic flux 6, induced by the magnetic pattern 5 of the first magnetic layer 2, is distributed in the intermediate layer 3 and the second magnetic layer 4. The magnetic field H of the flux 6 acts on the second magnetic layer 4 and is weaker than the coercive magnetic field Hc (T0)—for instance at a temperature T0 when a thermal pattern such as a temperature variation of environmental atmosphere is not applied—of the second magnetic layer 4. Accordingly, in part (a) of FIG. 1, the magnetic state of the magnetic recording medium is such that it has no image data.

The recording medium is subjected to flash exposure, or brought into contact with a thermal head, or illuminated by a laser beam spot, so that a thermal pattern is formed on the second magnetic layer 4. In this connection, it is assumed that a high temperature state is represented by a temperature T2, and a low temperature state by a temperature T1. (However, it should be noted that $T0 \leq T1 < T2$)

Figure 2A:
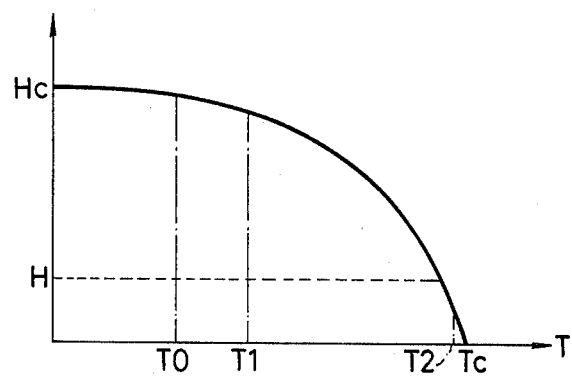
FIG. 2(a) is a graphical representation of the temperature dependence of a coercive field Hc.
Figure 2B:
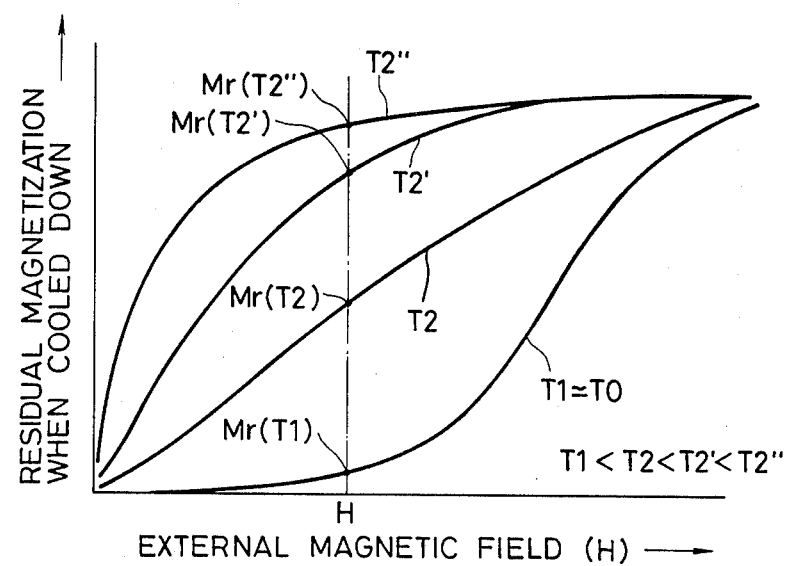
FIG. 2(b) is a graphical representation of the thermal residual magnetization phenomenon.

If the second magnetic layer is made of a material having a coercive field Hc which changes with temperature as indicated typically in part (a) of FIG. 2, then only the high temperature part T2 shows residual magnetization.

Part (a) of FIG. 2 is a graphical representation showing one example of the temperature dependence of a coercive field Hc. This temperature dependence is one of the thermomagnetic effects. In part (a) of FIG. 2, the horizontal axis represents temperature, and the vertical axis coercive fields. The reference character Tc designates the curie temperature.

The thermal residual magnetization phenomenon can be explained clearly with reference to part (b) of FIG. 2. According to the thermal residual magnetization phenomenon, when, under an external magnetic field H (the horizontal axis in part (b) of FIG. 2), a magnetic substance is heated to an initial temperature T2 and is then cooled to room temperature ($=T0 \approx T1$), it has a thermal residual magnetization of Mr(T2).

Accordingly, the transition from part (b) of FIG. 1 to part (c) of FIG. 1 can be described with reference to part (b) of FIG. 2 as follows. The magnetic field H (as indicated in part (b) of FIG. 2) is produced by the first magnetic layer 2 and acts on the second magnetic layer 4. When a latent image is formed, only the part T2 is heated to high temperatures T2' and T2" and then cooled to a temperature T0. This results in thermal residual magnetization Mr(T2), Mr(T2'), or Mr(T2"). On the other hand, the low temperature part T1 scarcely shows residual magnetization (Mr(T1)).

It can be understood that a magnetic latent image corresponding to the thermal pattern is formed by the above-described operation apparently without application of the external magnetic field.

The second magnetic layer 4 is made of a magnetic material which shows the above-described thermal residual magnetization phenomenon. The magnetic material should be such that the thermal residual magnetization appears in a high temperature range relatively close to room temperature. Most preferable examples of the magnetic material are a distribution coating of a $CrO_2$ magnetic layer whose curie temperature is about 130° C., and a non-crystalline alloy film of a rare earth metal—transition metal (such as Tb-Fe and Gd-Fe). The magnetic latent image which is thermomagnetically formed in the above-described manner is developed by fine powder known as "electrophotographic single-component magnetic toner."

A method of manufacturing a magnetic recording medium used in the above-described thermomagnetic recording method is, for instance as, follows. In order to form the first magnetic layer 2, the non-magnetic base layer 1 is coated with a mixture which is prepared by dispersing and suspending fine particles of Fe, or the like, in high molecular resin or a mixture which is prepared by dispersing and suspending particles of $\gamma$-$Fe_2O_3$ in high molecular resin. Alternatively, a Co-Ni-P alloy film may be formed by plating.

Next, a repetitive magnetic pattern is formed over the entire first magnetic layer 2 by a magnetic head or the like. Thereafter, when necessary, a high molecular resin layer such as a polyimide layer or a polyacrylate layer, is formed as the non-magnetic intermediate layer 3 by coating or the like. Finally, the intermediate layer 3 is coated with a mixture which is prepared by dispersing and suspending $CrO_2$ powder in a high molecular resin in order to form the second magnetic layer 4.

Figure 3:
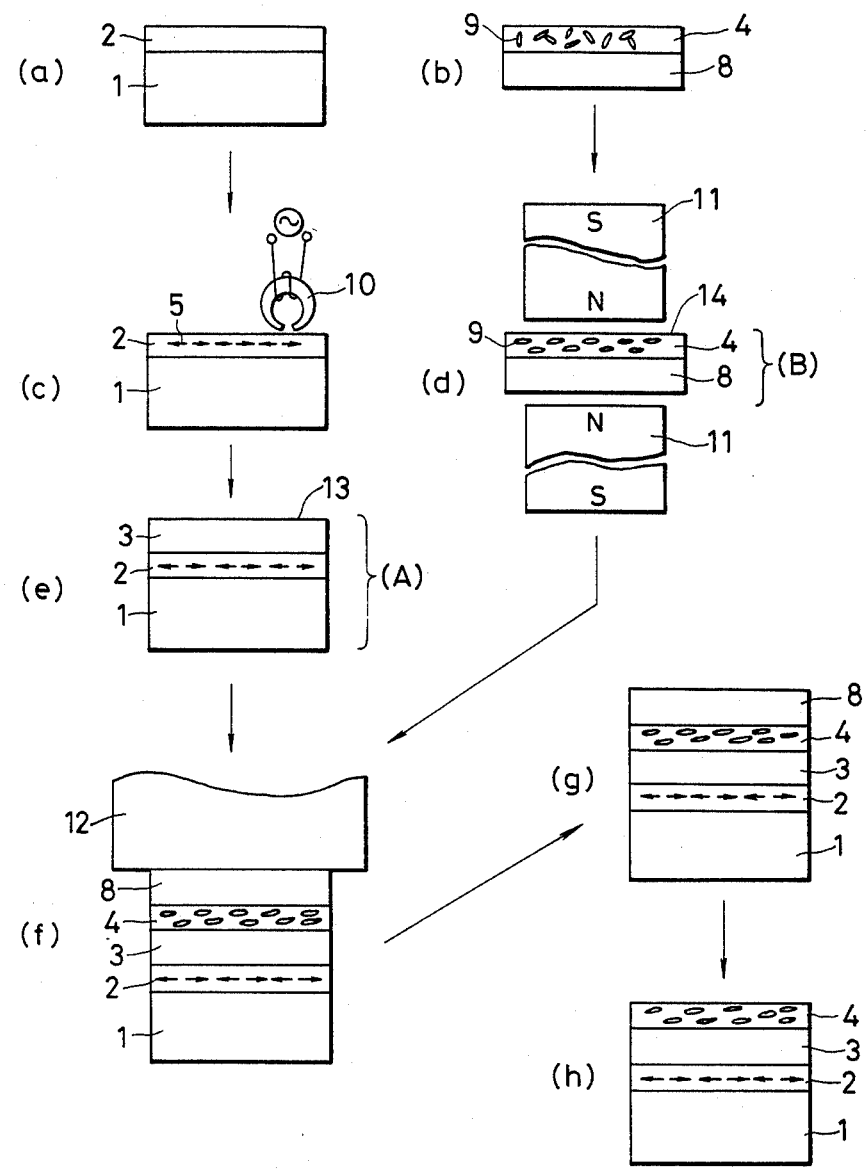
FIGS. 3(a)–3(h) schematically illustrate one method of manufacturing a magnetic recording medium according to the present invention.

FIG. 3 schematically illustrates a method for manufacturing a magnetic recording medium according to the present invention. In part (a) of FIG. 3, a non-magnetic base layer 1, made of a aluminum film or a high molecular resin film such as a polyimide film or a polyethylene terephthalate film, is coated with a suspension or slurry. The suspension or slurry is prepared by dispersing the above-described Fe particles and $\alpha$-$Fe_2O_3$ particles in a high molecular resin binding agent such as a vinyl chloride—vinyl acetate copolymer, a vinylidene chloride—acrylonitrile copolymer, or a urethane resin. In this manner, the first magnetic layer 2 is formed.

The base layer 1 and the first magnetic layer 2 are passed through a suitable magnetic field so that the magnetic particles are orientated in a predetermined direction, and are then dried. Alternatively, a Co-Ni-P alloy film whose magnetic particles are orientated in a predetermined direction, is formed by plating or the like.

In part (c) of FIG. 3, a predetermined repetitive magnetic pattern is formed in the first magnetic layer 2 by a magnetic head 10.

In part (e) of FIG. 3, a paint is prepared by dissolving a high molecular resin bonding agent, such as polymethyl methacrylate, vinyl chloride—vinyl acetate copolymer, or vinylidene chloride—acrylonitrile copolymer, in a solvent. The paint is applied to the first magnetic layer 2 to a predetermined thickness and is then dried. This forms an intermediate layer 3.

A second magnetic layer 4 is then formed as follows. A suspension or slurry prepared by dispersing $CrO_2$ needle particles in a high molecular resin binding agent such as a vinyl chloride—vinyl acetate polymer or a urethane resin, is applied to a base layer 8 made of a non-magnetic high molecular resin film such as polyimide, polyacrylate or polyether sulfone (part (b) of FIG. 3). Before it is dried or while it is being dried, the base layer 8, which has been coated with the suspension, is passed between orientating magnetic poles 11 so that the $CrO_2$ needle particles are orientated in a predetermined direction (part (d) of FIG. 3). In this manner, the second magnetic layer 4 is formed on the base layer 8.

The base layer 1, the first magnetic layer 2, and the intermediate layer 3 form a first laminated body A, while the base layer 8 and the second magnetic layer 4 form a second laminated body B. The second laminated body B is placed on the first laminated body A in such a manner that the surface 14 of the second laminated body B (part (d) of FIG. 3) is in contact with the surface 13 of the first laminated body A (part (e) of FIG. 3). A pressurizing plate 12 is placed on the base layer 8, so that the first and second laminated bodies are heated and pressed from the side of the base layer 8 (part (f) of FIG. 3).

Thereafter, the pressurizing plate 12 is removed from the laminated bodies. As a result, a thermo-magnetic recording medium as shown in part (g) of FIG. 3 is obtained. The base layer 8 serves as a layer for protecting the surface of the thermomagnetic recording medium; that is, it protects the second magnetic layer 4 from external mechanical friction and abrasion.

Mechanical friction and abrasion can be caused, for instance, when the thermomagnetic recording medium is slid along a heating means such as a heating head array, when a latent image is developed with magnetic toner, when a developed image is transferred onto a recording sheet, or when the remaining toner is cleaned. It is clear that mechanical friction and abrasion is a problem and may occur in the various processes of the magnetic copying apparatus.

The base layer 8, which is the outermost layer of the thermomagnetic recording medium, may be polished with a carborundum or corundum grindstone to improve the surface flatness and to give the base layer 8 a predetermined thickness. Alternatively, the base layer 8 may be completely removed, for example, by abrasion, as shown in part (h) of FIG. 3.

Another example of a method for manufacturing a magnetic recording medium according to the present invention will be described with reference to FIG. 4. Parts (a), (b), (c), and (d) of FIG. 4 are the same as parts (a), (b), (c), and (d) of FIG. 3 respectively.

Figure 4:
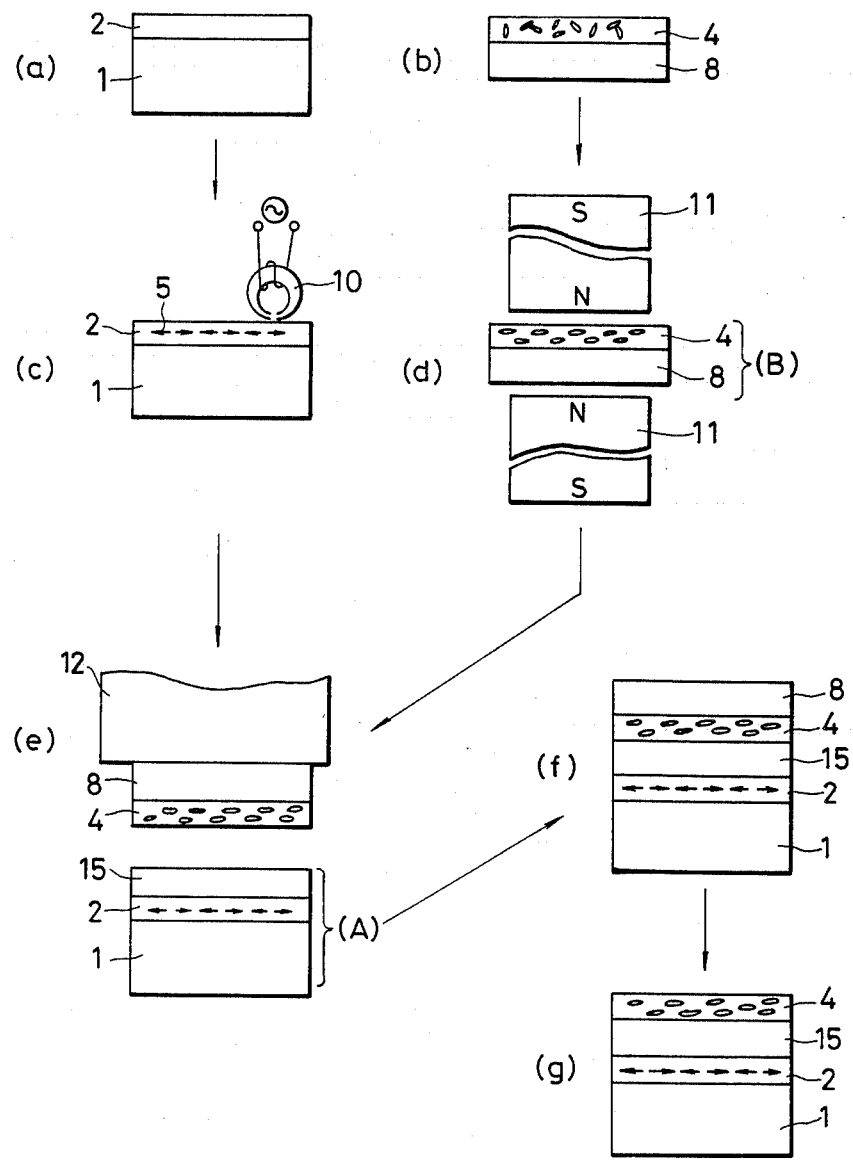
FIGS. 4(a) through 4(g) schematically illustrate an alternate method of manufacturing a magnetic recording medium according to the present invention.

The upper surface of the first magnetic layer 2 of the first laminated body A is coated with an epoxy adhesive, polyester adhesive, acryl adhesive or rubber adhesive, so that an adhesive layer 15 is formed thereon (part (e) of FIG. 4).

The second laminated body B, consisting of the base layer 8 and the second magnetic layer 4, is placed on the first laminated body A in such a manner that the second magnetic layer 4 is in contact with the adhesive layer 15. Subsequently, the first and second laminated bodies are pressed with the pressurizing plate 12. The first and second laminated bodies may be heated as they are pressed together. As a result, the first and second laminated bodies are bonded together by the adhesive layer 15.

The outermost layer 8 may be removed by abrading or polishing means, or may be polished to a predetermined thickness. (part (g) of FIG. 4).

The intermediate layer 3, in the first example, and the adhesive layer 15, in the second example, prevent the magnetic flux of the repetitive magnetization pattern formed in the first magnetic layer form leaking through the second magnetic layer 4 or through the base layer 8 remaining outside the second magnetic layer with the result that the background for a picture is made dirty or the contrast thereof is lowered.

Figure 5:
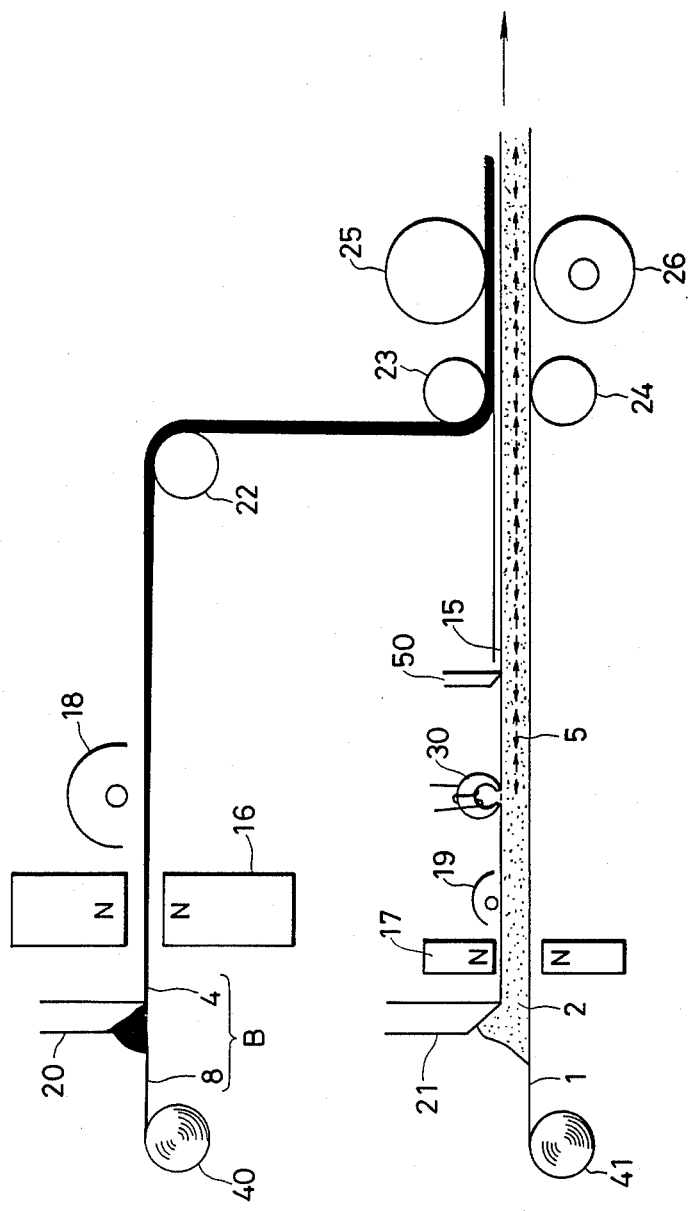
FIG. 5 is a schematic diagram of an apparatus for practicing the methods of manufacturing a magnetic recording medium according to the present invention.

One experiment carried out by the present inventors will be described with reference to FIG. 5. In FIG. 5 and FIGS. 3 and 4, like parts are designated by like reference numerals or characters. Magnetic paints prepared according to the following compounding ratios were applied to the base layers 1 and 8 (polyethylene terephthalate film, trade name "PET") to form the first and second magnetic layers 2 and 4, respectively:

| Magnetic Paint for the First Magnetic Layer | |
|---|---|
| Fe—Co alloy powder | 400 parts by weight |
| lecithin | 5 parts by weight |
| polyurethane resin | 50 parts by weight |
| silicone oil | 3 parts by weight |
| methyl ethyl ketone | 400 parts by weight |
| Magnetic Paint for the Second Magnetic Layer | |
| CrO2 powder | 400 parts by weight |
| lecithin | 3 parts by weight |
| VAGH(V.C.C.) | 50 parts by weight |

| -continued | |
|---|---|
| polyurethane resin | 50 parts by weight |
| silicone oil | 3 parts by weight |
| methyl ethyle ketone | 400 parts by weight |

The magnetic paints were applied to the base layer 1 and 8 with doctor blades 21 and 20, respectively, in such a manner that the coatings formed on the base layers 1 and 8 had a thickness of 5 um. In FIG. 5, reference numerals 40 and 41 designate supplies for the base layers 8 and 1, respectively.

The first laminated body and the second laminated body were subjected to magnetic orientation by being passed through orientating magnetic pole units 17 and 16 in each of which the same magnetic poles confronted each other. Thereafter, these bodies were dried by drying units 19 and 18, respectively. The magnetic layer 2 was then magnetized by a magnetic head 30.

The magnetic head 30 had a gap width of 20 um and a track width of 300 mm. The writing signal was a sinusoidal wave of 400 Hz, and the writing current was 500 mA. The speed of conveyance of the magnetic layer 2 on the base layer in the direction of the arrow was 20 mm/sec. Therefore, the wavelength of the repetitive magnetization pattern 5, which was uniformly written in the magnetic layer 2, was 50 um.

The acrylic adhesive 15 was applied to the surface of the magnetic layer 2 to a thickness of 8 $\mu$m with a doctor blade 50.

Next, the base layer 8 bearing the second magnetic layer 4 which was formed in another process was joined with the acrylic adhesive on the first magnetic layer 2 by means of conveying rolls 22, 23, and 24, so that a laminated structure was formed.

The laminated structure was pressed by a roll 25 and heated by a heating roll 26 (having a surface temperature of 80 C.), so that the layers therein were strongly joined together.

A thermal head (8 dots/mm, manufactured by Rome Co.) was placed on the surface of the second magnetic layer 4 of the magnetic recording medium thus manufactured. Under this condition, the magnetic recording medium was heated according to electrical signals representing image data while being run at a predetermined speed, so that a magnetic latent image was formed therein.

Thereafter, the magnetic recording medium was removed from the thermal head. The surface of the second magnetic layer was subjected to toner development. The resultant toner image was transferred onto an ordinary sheet (type "M" manufactured by Fuji Xerox Co.) and fixed with a hot roll. As a result, an excellent hard copy was obtained having a resolution of 8 dots/mm and an image density of 1.2.

In the experiment described with reference to FIG. 5, unlike the example in FIG. 4, the base layer 8 of the second laminated body B was bonded to the adhesive layer 15 of the first laminated body A. However, the same effect was obtained in an experiment in which, as in the example in FIG. 4, the second magnetic layer 4 of the second laminated body B was bonded to the adhesive layer 15.

As is apparent from the above description, in the invention the coercive force and the residual magnetism of the first magnetic layer are larger than those of the second magnetic layer.

While the salient features of the invention have been described with reference to the drawings, it should be understood that preferred embodiments described herein are susceptible of modification and alteration without departing from the spirit and scope to the following claims.

What is claimed is:

1. A method of manufacturing a magnetic recording medium comprising the steps of:
    forming a first laminated body by coating a first magnetic layer on one surface of a first base member;
    forming a repetitive magnetization pattern in said first magnetic layer;
    forming a second laminated body by coating a second magnetic layer on one surface of a second base member, said second magnetic layer being comprised of a material that will retain magnetization when heated and then cooled in the presence of a magnetic flux;
    orienting the magnetic particles in said second magnetic layer in a predetermined direction;
    bonding said first magnetic layer of said first laminated body to said second magnetic layer of said second laminated body through an intermediate layer; and
    removing at least part of said second base member to form a magnetic recording medium having magnetic flux from said first magnetic layer being applied to said second magnetic layer.

2. A methd according to claim 1 wherein said step of removing comprises abrading said second base member.

3. A method according to claim 1 wherein said step of forming a repetitive magnetization pattern in said first magnetic layer comprises the steps of:
    positioning a magnetic write head proximate said first magnetic layer; and
    applying an alternating current to said magnetic write head.

4. A method according to claim 1 wherein said orienting steps comprises applying a unidirectional magnetic field to said second magnetic layer.

5. A method for manufacturing a magnetic recording medium comprising the steps of:
    forming a first laminated body by coating a first magnetic layer on one surface of a first base member;
    forming a repetitive magnetization pattern in said first magnetic layer;
    forming a second laminated body by coating a second magnetic layer on one surface of a second base member, said magnetic layer being comprised of a material that will retain magnetization when heated and then cooled in the presence of a magnetic flux;
    applying a magnetic field to said second magnetic layer to orient the magnetic particles in said second magnetic layer in a predetermined direction; and
    bonding said first laminated body to said second laminated body to form a magnetic recording medium having magnetic flux from said first magnetic layer being applied to said second magnetic layer.

6. A method according to claim 5 wherein said step of forming a repetitive magnetization pattern in said first magnetic layer is performed by:
    positioning a magnetic write head proximate said first magnetic layer; and
    applying an alternating current to said magnetic write head.

7. A method according to claim 6 wherein said bonding step comprises bonding said first laminated body to said second laminated body through an intermediate layer.

8. A method according to claim 6 wherein said bonding step comprises bonding said second base member to said first magnetic layer.

9. A method according to claim 6 wherein said bonding step comprises bonding said second magnetic layer to said first magnetic layer.

10. A method according to claim 6 wherein the magnetic particles in the second magnetic field are oriented by applying a unidirectional magnetic field to said second magnetic layer.

* * * * *